United States Patent Office
3,503,123
Patented Mar. 31, 1970

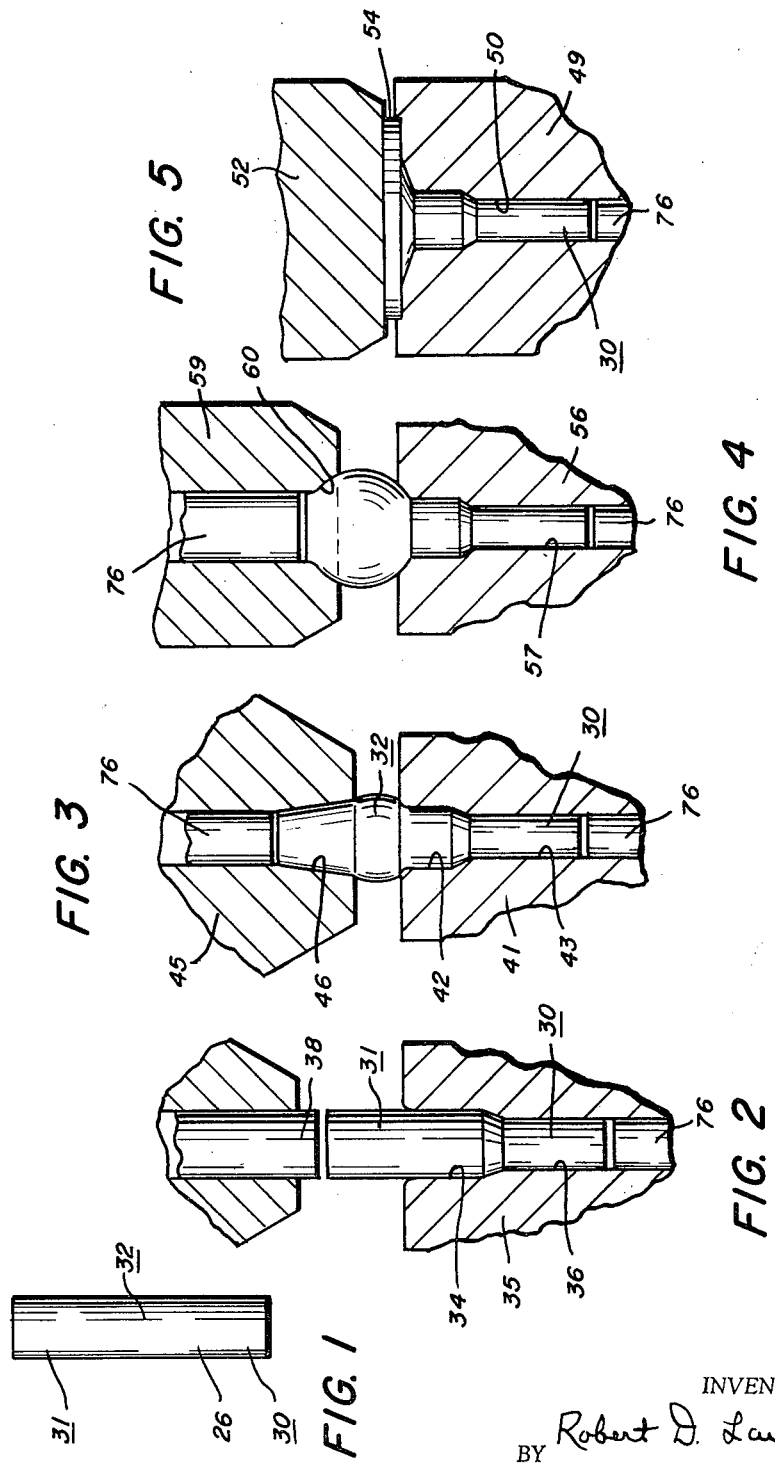

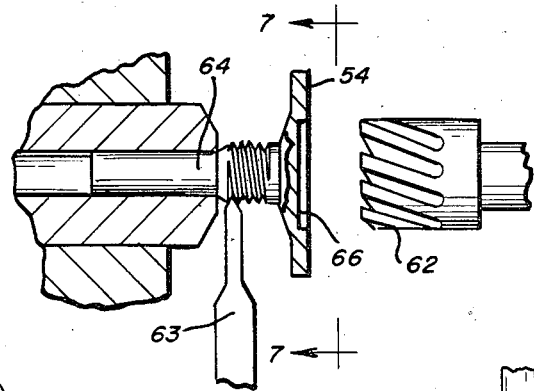
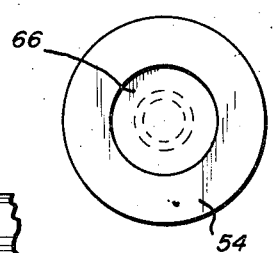
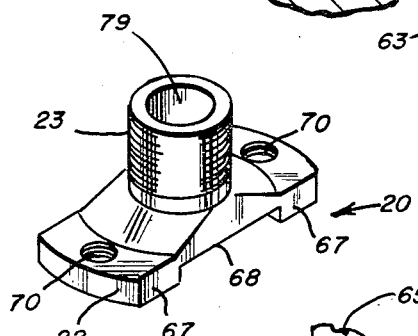
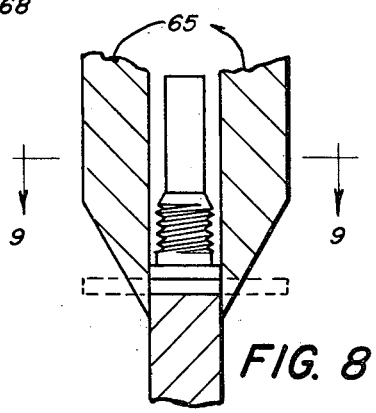
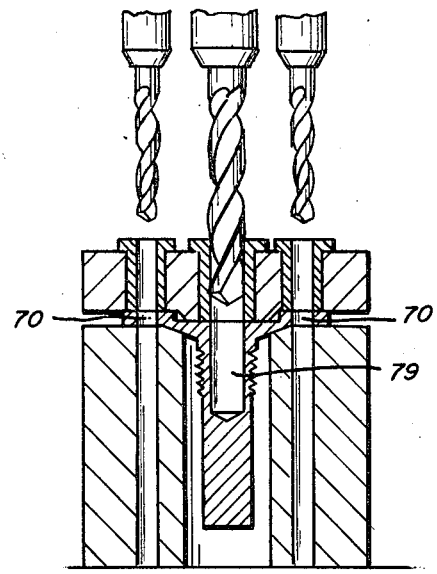
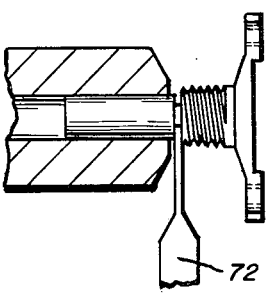
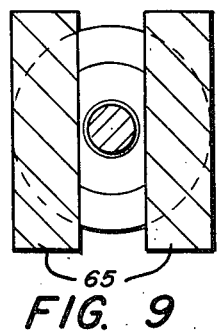

3,503,123
METHOD OF MAKING A FITTING
Robert D. Law, Brooklyn, Ohio, assignor to Tru-Fit Screw Products Corporation, a corporation of Ohio
Filed Jan. 18, 1968, Ser. No. 698,942
Int. Cl. B23p 13/02
U.S. Cl. 29—558                          5 Claims

ABSTRACT OF THE DISCLOSURE

The method of making a fitting having a conduit portion integrally connected to a mounting base which has spaced feet, by selecting a cylindrical metal blank of generally constant diameter throughout its length and at a first station cold heading the same to increase the diameter of one end of the blank relative to the other. Moving the blank to a second station where by cold heading the diameter of the one end is further reduced and the other end is formed into a generally frusto-conical shape and at a final station cold heading the blank to completely flatten the other end to produce a head which has a diameter of at least four times that of the shank. Counterboring the head and then cutting off the metal of the head along parallel, spaced and tangential lines on either side of the center of the head which lines substantially intersect the counterbore to produce spaced feet with a recessed portion therebetween. The excess shank is removed, an axial opening is produced through the head and shank and the shank is threaded.

---

An object of the invention is to provide a method of cold heading a cylindrical blank whereby a head of good circular contour can be produced which is at least four times the diameter of its integrally connected shank.

Another object of the invention is to provide a method of making a fitting of a one piece design.

Another object of the invention is to provide a method of making a mounting base with spaced feet and a recessed portion therebetween and an integrally connected shank or extension connected thereto.

Other objects and a fuller understanding of the invention may be had by referring to the following description and claims, taken in conjunction with the accompanying drawings, in which:

FIGURE 1 is an elevational view of the cylindrically shaped metal blank utilized in the practice of the present invention;

FIGURE 2 is a view of the blank located in a die at a first station;

FIGURE 3 is a view of the blank located in a die at a second station;

FIGURE 4 is a view of the blank in a die at a third station;

FIGURE 5 is a view of the blank in a die at a fourth and final station;

FIGURE 6 illustrates a counterbore being produced in the blank and threads being produced thereon;

FIGURE 7 is a view taken generally along the line 7—7 of FIGURE 6;

FIGURE 8 shows the method of cutting off the material of the head to produce the base of the finished article;

FIGURE 9 is a view taken generally along the line 9—9 of FIGURE 8;

FIGURE 10 shows the drilling of an axially extending opening through the head and shank of the blank and the drilling of holes in the opposite outboard parts of the head which will be the base of the finished article;

FIGURE 11 shows the method of parting or removing the end of the shank of the blank; and FIGURE 12 is an isometric view of the finished article produced by the method of the present invention.

The method of the present invention involves itself with the production of finished articles such as shown in FIGURE 12 of the present drawings. In devices such as the finished gas fitting 20 which is shown in FIGURE 12, these items were previously manufactured in two parts, the one part comprising the base 22 and the other part comprising the threaded fitting portion 23. These parts were then preferably welded together resulting in an additional operation and also resulting in unreliably connected parts in that gas leakage many times resulted, between the two parts at their point of connection. The present method involves itself with the advantage that the part can be conveniently manufactured of a one piece integral assembly in an extremely economical manner wherein the previous problem of gas leakage no longer has to be considered. This has been brought about by the ability to manufacture a large headed member with respect to the shank so that the base 22 can be appropriately constructed therefrom. This in turn has come about because of the specific die shapes and steps involved in a progressive cold forming operation as will be described in more detail hereinafter.

The method of the present invention involves the selecting of a cylindrical metal blank 26 shown in FIGURE 1 which has first and second end portions 30 and 31 respectively and an intermediate portion 32 located therebetween. The first end portion of the blank 26 is positioned in an opening 34 (FIGURE 2) of a first die 35 and a reduced opening 36 is located in the die 35 beyond the termination of opening 34. A first hammer 38 is utilized to strike the extreme second end portion of the blank 26 while the blank is in a cold condition to exert a force in an axial direction which serves to extrude the first end portion 30 of the blank into the reduced opening 36 to reduce its circumference or diameter and to enlarge the circumference or diameter of the second end portion 31. The reference to striking the blank while it is cold is meant to exclude what are generally referred to in the art as hot forming operations and it will be appreciated by those skilled in the art that as the blank proceeds through the steps of the present invention, it may develop an increase in temperature because of the blows which are struck against it by the various hammers. The hammer 38 includes the outer surrounding member shown and the two parts are fixedly connected together.

The blank is then removed from the die 35 by transfer mechanism (not shown) which will be readily appreciated by those skilled in the art and is moved to a second die 41 whereat the extruded first end portion is placed in an opening 42 and as will be noted, another reduced opening 43 is connected to opening 42 in a manner similar to that shown in FIGURE 2. A hammer 45 which has an opening 46 which is generally frusto-conical in shape is utilized to strike the second end portion 31 of the blank 26 and the second end portion of the blank is received in the opening 46 and a force is exerted in an axial direction to further extrude the first end portion 30 of the blank into the reduced opening 43 to reduce its circumference and this also causes the second end portion 31 of the blank to be formed into a frusto-conical shape and the intermediate portion 32 of the blank is caused to be bulged outwardly as shown at its location between the die 41 and the hammer 45.

In the event it is desired to produce a finished part wherein the head is greater than four times the diameter of the shank but less than approximately five times the diameter of the shank, the die and hammer shown in FIGURE 4 can be ignored and the blank from FIGURE 3 can be transferred directly to the die 49 shown in FIG- URE 5. The die 49 referred to in FIGURE 5 may also be described as a final die and the first end portion of the blank from the operation of FIGURE 3 is placed in an opening 50 in a die 49 which receives the same. This opening substantially conforms to the size of the first end portion from the die 41. A hammer 52 with a relatively flat surface is utilized to strike the second end portion of a blank while the blank is in a cold condition which serves to exert a force in an axial direction which flattens the second end portion into a head 54 which has a diameter which is at least four times that of the first end portion 30 of the blank.

In the event it is desired that the finished head have a diameter which is from five to six times the diameter of the shank, it is then necessary to proceed through the step which is illustrated in FIGURE 4. This step follows the operation of FIGURE 3 and precedes the operation shown in FIGURE 5. The blank 26 is removed from the die 41 shown in FIGURE 3 and transferred to a third die 56 where the first end portion of the blank is received in an opening 57 and a hammer 59 which has an opening 60 which is generally of the shape of the surface of a portion of a sphere is utilized to strike the second end portion of the blank which in turn exerts a force in an axial direction which forms the second end portion of the bank into a partial spherical shape as shown. As mentioned hereinabove, the blank is then moved to the die of FIGURE 5. Ejection pins are provided in the dies and hammers and are all identified by number 76. These pins simply remove the part after the operation is complete.

This procedure and method which has been defined hereinabove in the use of the particularly shaped hammers and dies is uniquely adapted to produce a large headed member, as compared to the diameter of an integrally connected shank, wherein the heads may be from four to six times as large as the diameter of the shanks.

FIGURES 6 through 11 demonstrate the method of the present invention and the steps necessary to proceed from FIGURE 5 to the finally finished article 20 shown in FIGURE 12. FIGURE 6 shows a tool 62 producing a counterbore 66 in the head 54 of the large headed member and shows a tool 63 for producing threads on the outside surface of the shank 64 adjacent the head 54. FIGURE 8 shows shearing mechanism 65 which cut the material of the head along two generally parallel and spaced lines on either side of the center line of the head in generally tangential directions which cuts intersect the counterbore 66 which in turn produces the base 22 of the finished item 20 (FIGURE 12) with spaced feet 67 separated by a recessed intermediate portion 68.

FIGURE 10 demonstrates the drilling of openings 70 (which are subsequently tapped) in each of the spaced feet 67 as well as boring a hole 79 through the head 54 and into the shank 64. FIGURE 11 shows the use of a parting tool 72 to cut the shank 64 off to its finished dimension.

FIGURE 12 as pointed out hereinabove, shows the final article of manufacture and the base may be suitably connected to a mounting mechanism such as a valve by means of screws through the openings 70 and gas can be conducted through the central opening 79 of the fitting and conducted to a desired destination by means of a conduit appropriately connected to the threaded fitting portion 23.

It will, therefore, be seen that by the method of the present invention extremely large headed members can be produced relative to the size of their integrally connected shanks and with proper manipulation and machining of the head as disclosed, an appropriate base part can be manufactured in a unique and economical manner.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of making an integral one piece fitting from a cylindrical metal blank having first and second end portions comprising the steps of placing said first end portion of said blank into a first die which has an opening to receive the same and a reduced opening therebeyond, striking the second end of said blank while the blank is cold with a hammer to exert a force in an axial direction to extrude said first end portion of said blank into said reduced opening and reduce its circumference and enlarge the circumference of said second end portion, placing said first end portion of said blank into a second die which has an opening to receive the same and a reduced opening therebeyond, striking the second end portion of said blank while the blank is cold with a hammer which has an opening of generally frusto-conical shape to receive a part of said second portion of said blank to exert a force in an axial direction to further extrude said first end portion of said blank into said reduced opening and reduce its circumference and to form said second end portion into a generally frusto-conical shape and bulge outwardly an intermediate portion of said blank between the die and hammer, placing said first end portion of said blank into a final die which has an opening to receive the same, striking the second end portion of said blank while the blank is cold with a hammer which has a flat face to exert a force in an axial direction to flatten said second end portion into a head which is at least four times the diameter of said first end portion producing a counterbore in said head, and cutting off the material of said head along two generally parallel and spaced lines on either side of the centerline of the head and in generally tangential directions and intersecting said counterbore to produce a base with spaced feet and a recessed intermediate portion.

2. The method of claim 1 wherein an additional die is interposed before said final die which additional die has an opening to receive said first end portion of said blank, striking the second end portion of said blank with a hammer which has an opening which has a surface of at least a portion of the surface of a sphere to receive a part of said second portion of said blank to exert a force in an axial direction to form said second end portion into a partial spherical shape wherein said last-mentioned die and hammer in claim 1 in producing said head produces a head which is at least five times the diameter of said first end portion.

3. The method of claim 1 wherein an axial opening is produced through said head and the portion of the formed blank adjacent thereto, and threads are formed on said adjacent portion, and the first end portion outwardly of said threads and said axial opening is severed from the remainder of the blank.

4. The method of making a large headed member from a cylindrical metal blank having first and second end portions comprising the steps of placing said first end portion of said blank into a first die which has an opening to receive the same and a reduced opening therebeyond, striking the second end of said blank while the blank is cold with a hammer to exert a force in an axial direction to extrude said first end portion of said blank into said reduced opening and reduce its circumference and enlarge the circumference of said second end portion, placing said first end portion of said blank into a second die which has an opening to receive the same and a reduced opening therebeyond, striking the second end portion of said blank while the blank is cold with a hammer which has an opening of generally frusto-conical shape to receive a part of said second portion of said blank to exert a force in an axial direction to further extrude said first end portion of said blank into said reduced opening and reduce its circumference and to form said second end portion into a generally frusto-conical shape and bulge outwardly an intermediate portion of said blank between the die and hammer, placing said first end portion of said blank into a final die which has an opening to receive the same, striking the second end portion of said blank while the blank is cold with a hammer which has a flat face to exert a force in an axial direction to flatten said second end portion into a head which is at least four times the diameter of said first end portion.

5. The method of claim 4 wherein an additional die is interposed before said final die, which additional die has an opening to receive said first end portion of said blank, striking the second end portion of said blank with a hammer which has an opening which has a surface of at least a portion of the surface of a sphere to receive a part of said second portion of said blank to exert a force in an axial direction to form said second end portion into a partial spherical shape wherein said last-mentioned die and hammer in claim 4 in producing said head produces a head which is at least five times the diameter of said first end portion.

References Cited

UNITED STATES PATENTS

| | | | |
|---|---|---|---|
| 1,351,949 | 9/1920 | Fuchs | 72—377 X |
| 2,141,753 | 12/1938 | Hufferd et al. | 72—377 X |
| 2,145,282 | 1/1939 | Weatherhead | 29—157 |
| 2,170,811 | 8/1939 | Cornell | 29—558 X |
| 2,799,027 | 7/1957 | Hatebur | 72—377 X |

JOHN F. CAMPBELL, Primary Examiner

VICTOR A. DiPALMA, Assistant Examiner

U.S. Cl. X.R.

72—377